(12) United States Patent
Ungerechts et al.

(10) Patent No.: US 9,038,676 B2
(45) Date of Patent: May 26, 2015

(54) CONVEYING DEVICE FOR POWDERY AND/OR GRANULATED MATERIAL

(75) Inventors: Herbert Ungerechts, Kerken (DE); Hans-Joerg Frank, Toenisvorst (DE); Dieter Scholten, Alsdorf (DE); Markus Hagedorn, Muelheim/Ruhr (DE)

(73) Assignee: Bayer MaterialScience AG, Leverkusen (DE)

( * ) Notice: Subject to any disclaimer, the term of this patent is extended or adjusted under 35 U.S.C. 154(b) by 526 days.

(21) Appl. No.: 13/428,574

(22) Filed: Mar. 23, 2012

(65) Prior Publication Data
US 2012/0251246 A1   Oct. 4, 2012

(30) Foreign Application Priority Data

Mar. 30, 2011   (EP) .................................. 11160513

(51) Int. Cl.
*B65B 1/06* (2006.01)
*B65G 11/10* (2006.01)
*B65B 1/32* (2006.01)
*B65G 11/14* (2006.01)
*B65G 11/18* (2006.01)
*B65G 67/06* (2006.01)
*B65G 69/18* (2006.01)

(52) U.S. Cl.
CPC .............. *B65G 11/106* (2013.01); *B65B 1/32* (2013.01); *B65B 1/06* (2013.01); *B65B 2210/06* (2013.01); *B65G 11/146* (2013.01); *B65G 11/186* (2013.01); *B65G 67/06* (2013.01); *B65G 69/181* (2013.01)

(58) Field of Classification Search
CPC ............. B65B 1/04; B65B 1/06; B65B 1/32; B65B 2210/06; B65B 2210/08

USPC ............................ 141/1, 83, 89–91, 94, 231
See application file for complete search history.

(56) References Cited

U.S. PATENT DOCUMENTS

| | | | | |
|---|---|---|---|---|
| 3,241,581 A * | 3/1966 | Richardson et al. | ............ | 141/93 |
| 3,738,464 A * | 6/1973 | Ortlip et al. | .................. | 141/284 |
| 3,944,090 A * | 3/1976 | Flood | ............... | 141/35 |
| 4,334,900 A * | 6/1982 | Neumann | .................... | 55/350.1 |
| 4,819,702 A * | 4/1989 | Gerlach | ........................ | 141/232 |
| 4,983,090 A * | 1/1991 | Lehmann et al. | ............. | 414/326 |
| 5,372,229 A * | 12/1994 | Leibling | ....................... | 414/299 |
| 5,749,470 A * | 5/1998 | Operschall et al. | ............... | 209/2 |
| 5,845,686 A | 12/1998 | Okumura et al. | | |
| 5,881,780 A | 3/1999 | Matye et al. | | |
| 8,568,127 B2 * | 10/2013 | Gebert | ........................ | 425/398 |
| 8,622,187 B2 * | 1/2014 | Ungerechts et al. | ............ | 193/15 |
| 8,783,465 B2 * | 7/2014 | Ungerechts et al. | .......... | 209/137 |
| 2005/0034957 A1 * | 2/2005 | Bonita | ......................... | 193/2 R |
| 2012/0230146 A1 * | 9/2012 | Ungerechts et al. | .......... | 366/138 |
| 2012/0247915 A1 * | 10/2012 | Ungerechts et al. | ............ | 193/15 |

(Continued)

FOREIGN PATENT DOCUMENTS

| | | |
|---|---|---|
| DE | 195 272 40 C1 | 9/1996 |
| EP | 1475348 A1 | 11/2004 |
| GB | 892315 A | 3/1962 |

*Primary Examiner* — Nicolas A Arnett
(74) *Attorney, Agent, or Firm* — Drinker Biddle & Reath LLP

(57) ABSTRACT

A conveying device for free-flowing fine-particle solids, in particular for powdery and/or granular (mixed) material, especially plastic granulate, includes a vertically arranged and flexibly mountable telescopic pipe for the conveyance of, preferably, polymer granulates, for example in a plant for the filling of polymer granulates.

13 Claims, 2 Drawing Sheets

(56) References Cited

U.S. PATENT DOCUMENTS

| | | | |
|---|---|---|---|
| 2012/0248012 A1* | 10/2012 | Ungerechts et al. | 209/137 |
| 2012/0251246 A1* | 10/2012 | Ungerechts et al. | 406/34 |
| 2012/0251247 A1* | 10/2012 | Ungerechts et al. | 406/34 |
| 2012/0251249 A1* | 10/2012 | Ungerechts et al. | 406/38 |

\* cited by examiner

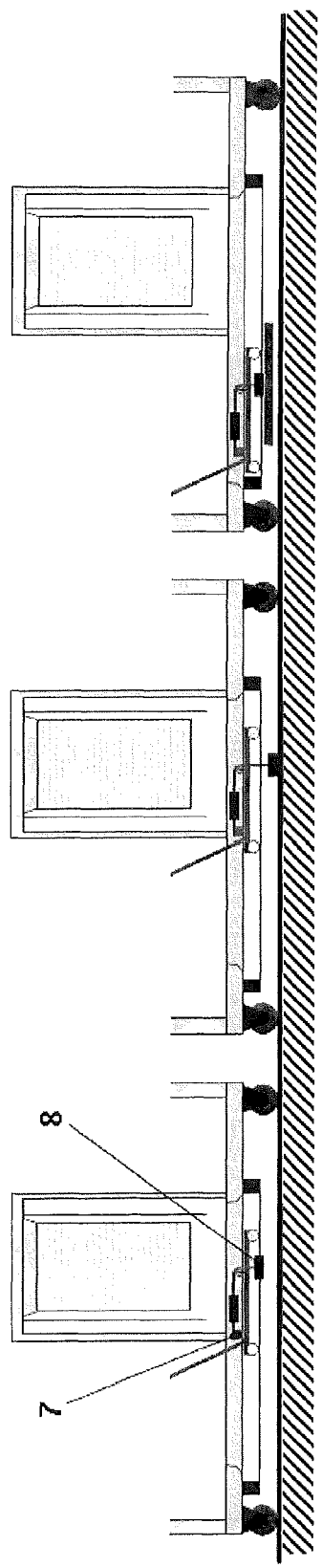

CONVEYING DEVICE FOR POWDERY AND/OR GRANULATED MATERIAL

BACKGROUND OF THE INVENTION

1. Priority

Priority is claimed to European Patent Application No. 11 160 513.5, filed Mar. 30, 2011, the disclosure of which is incorporated herein by reference in its entirety.

2. Field of the Invention

The field of the present invention is conveying devices for free-flowing fine-particle solids, in particular for powdery and/or granular (mixed) material, especially plastic granulate, such as are used in a filling plant for polymer granulates.

3. Background

The gravelly product which accumulates in the reactor in the manufacture of thermoplastic plastics is plasticized in an extruder and shaped into single strands, which are cut into granulates by means of a blade which rotates in the granulating tool. In a further step, this product can be provided with further components by compounding.

By compounding is meant, in polymer processing, the manufacture of finished plastic moulding material, the compound, from the plastic raw materials, with the addition of fillers and reinforcing agents, softeners, adhesion-promoting agents, lubricants, stabilizers, etc. The compounding predominantly takes place in extruders and comprises the process operations conveyance, melting, dispersion, mixing, degassing and pressurization.

In granulation, the melt is then pressed through the openings in a die base, so that after this, in the case of strand granulation, melt strands are initially produced, which then in the granulation produce cylindrical granules, or else, in the case of head granulation, are cut directly at the outlet on the die base and then produce lenticular or spherical granules. Granulation can also take place, for instance, in a liquid flow, which cools the granules and largely prevents agglomeration. The granulate is subsequently dried and sifted.

Subsequent to the post-manufacture or post-compounding granulation, the product is generally conveyed pneumatically to a silo or bunker. After this, the bulk material is removed from the silo or bunker and filled into containers or silo vehicles, or the bulk material is bagged into big bags, octabins or sacks. In each of these steps, dusts/deposits can be formed, for example, by abrasion, which dusts/deposits, in addition to the bulk material itself, can then cause contamination when the bulk material is changed.

Typical bulk materials are, for example, construction materials, such as topsoil, sand, gravel, ballast, cement, other mineral products, such as ore, road salt, and foods, such as grain, sugar, table salt, coffee, flour, as well as powdery products such as pigments, fillers, granules, pellets, etc.

At the same time, the demand for flexibility is constantly increasing, so that in a filling plant equipment can be exchanged according to needs. For instance, in the case of a bulk material, there may be a demand for a sifter (dedusting unit) to remove fine particles, whilst for other bulk materials only a conveying pipe is necessary. Moreover, the investment costs are not inconsiderable, so that a flexible solution for the use of, for instance, a conveying pipe at various locations in a plant is enabled.

DE 195 272 40 C1 describes a conveying device, wherein a portion of the conveying line between two rigidly spaced counter bearings is arranged such that it is exchangeable and the exchangeable conveying line portion is configured to be telescopic under the action of a tension spring and the ends of the telescopic arrangement are supported against the counter bearings. The design-conditioned, appropriate cleaning effort for the avoidance of contamination as soon as another solid is conveyed, particularly in the pipe flange region and in the pipe inner contour, is disadvantageous.

The demand for easy washability of conveying devices prior to the conveyance of another bulk material type is made, however, with increasing frequency.

SUMMARY OF THE INVENTION

The object of the present invention is therefore to eliminate the drawbacks of the prior art.

Since the prior art allows no adequate solution to the stated problems, a conveying device is provided which allows a seal-tight connection between solids removal devices and solids transport container, which are arranged vertically one above the other on levels of different height. In this case, different filling heights of the container have to be compensated. These telescopic conveying pipes should, in particular, be usable at different positions within a filling building and, for this purpose, should be exchangeable and easily, yet securely mountable.

BRIEF DESCRIPTION OF THE DRAWINGS

In the drawings, wherein like reference numerals refer to similar components:

FIG. 2. shows a floor cover lifting and transporting device with the individual work steps.

DETAILED DESCRIPTION OF THE PREFERRED EMBODIMENTS

Figure 1:
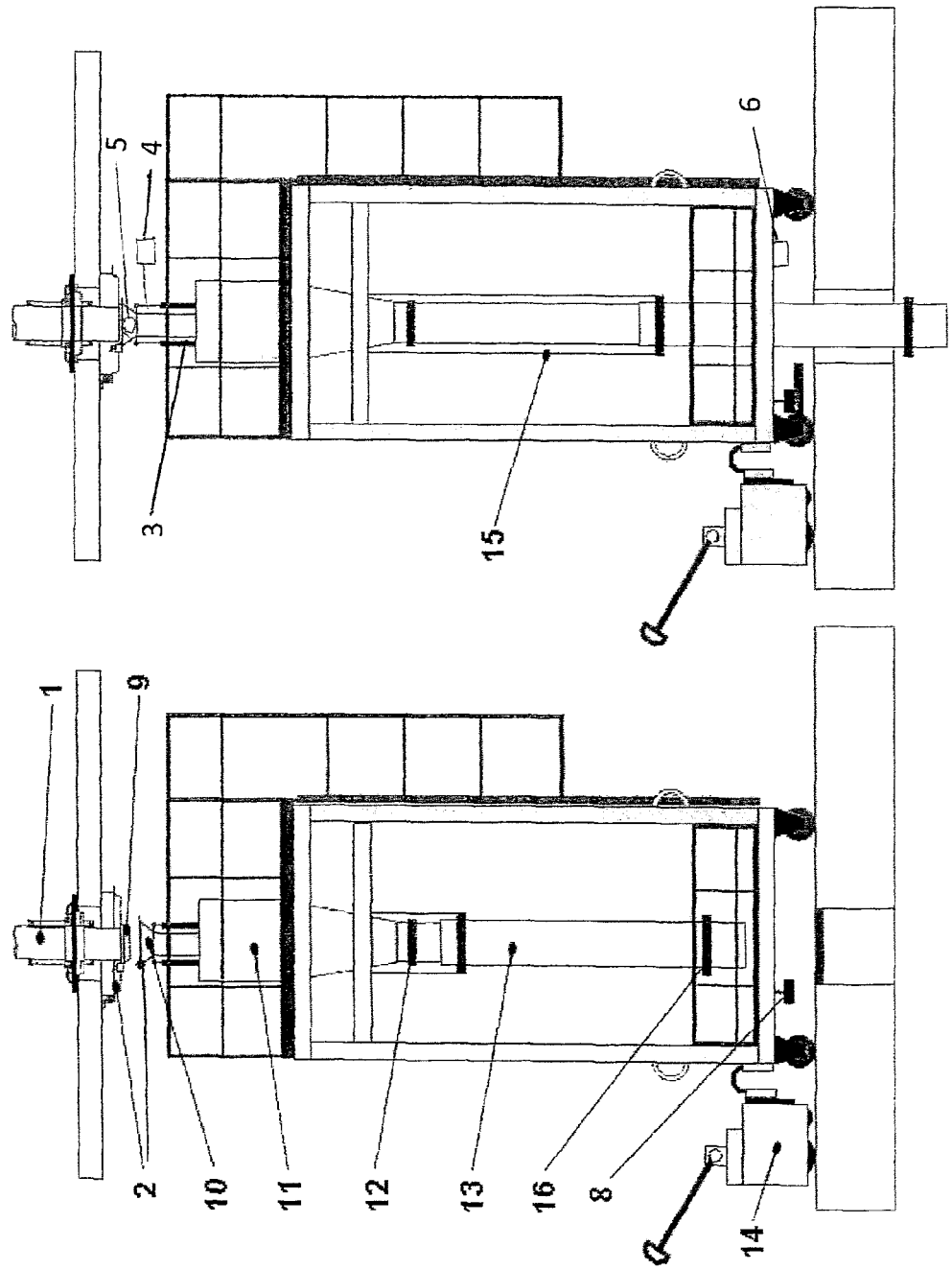
FIG. 1. shows a telescopic conveying pipe in the retracted state and in the docked state.

A conveying device which meets the defined object includes a telescopic conveying pipe and preferably has the following features:

a) an initial lifting pipe (10) with a conical inlet flange on the upper conveying pipe with radial tolerance compensation and restoring springs b) a continuous transit weigher (11) with a funnel and a fixed section of pipe c) a large lifting pipe (13) with a cable winch (15) and slack cable monitoring d) a resting ring (16) and filling level monitoring at the conveying pipe outlet e) an annular flushing device (12) on the telescopic pipe f) partly fixedly mounted flushing device components, flushing pipes or a flushing ball with flange g) the pipelines, tubing for compressed air, fully demineralized water and waste water h) the closing, controlling valves i) local control unit for the filling and flushing processes j) where necessary, sensors on one or both flanges of the conveying pipe, by means of which the docking of a pipe end to a docking device or to a counter flange can be reliably detected by a so-called initiator query;

k) where necessary, arrangement of the pipe on a mobile work platform for transport of the pipe to different filling locations on the stage, the mobile work platform containing lifting and lowering device (10, 15) for positioning of the pipe at different docking devices on a stage;

l) where necessary, a lifting/transporting device (8) for secure removal of the floor covering m) where necessary, a docking device for a small tractor (14)/mover for the driven transporting of the work platform.

The telescopic conveying pipe is not a rigid pipe, but consists of two or more pipe segments—which do not necessarily have to have a cylindrical form, but may also have a polygonal cross section—which are put together and can be displaced in one another (see FIG. 1). This produces a conveying pipe of a length which can be varied by telescopically pushing the interconnected pipe segments into one another or pulling them apart.

In a particularly preferred embodiment, (as far as) possible the solids conveying device (FIG. 1) contains no dead spaces or joints of any kind in which remains of solid material could remain after filling operations and subsequently contaminate portions of solids that have undergone filling. The sealing of the mutually dislaceable pipe segments takes place in such a way that no dead spaces that could be filled with remains of granulate occur.

For the reliable removal of possibly still adhering remains of dust or granulate, such a telescopic granulate conveying pipe (FIG. 1) is flushed with water or another suitable liquid on the surfaces that come into contact with the product. The telescopic granulate conveying pipe additionally also includes an optionally annular flushing device (12, FIG. 1) for the outer side of the telescopic pipe. Moreover, a flushing ball with flange is placed onto the inlet flange of the initial lifting pipe (10). A flushing program runs in the local control unit and provides an automated flushing process, which selects the flushing components from the top downwards, and consequently brings about an introduction of water via flushing balls (valves) (5) and nozzles. The waste water runs out of the telescopic granulate conveying pipe to the lowest level, then via a filter cart into a waste-water channel.

In a further particularly preferred embodiment, an amount of solid material filled through the telescopic conveying pipe (FIG. 1) is introduced into a transporting container located thereunder, such as for example a silo truck or freight container. A weighing device for filling is generally located at each filling point, and so it is desirable to integrate a weighing device in the mobile filling devices in order to avoid a plurality of fixedly installed weighing devices or a central weighing device with feed lines, which in turn have to be flushed. In this embodiment, for example, a high-performance through-flow weigher (11) is connected directly to the telescopic conveying pipe (13), so that during the filling operation the amount of solid material flowing through the telescopic conveying pipe into the transporting container can be continuously recorded and monitored. FIG. 1 illustrates such a construction.

For docking onto the above tube outlet flange (9) of the granulate conveying pipe (1), preferably an initial lifting pipe (10) with a complementary flange is placed on in a seal-tight and dead-space-free manner, controlled from the lower level. In this case, positional tolerances of the pipe outlet flange (9) are compensated by the initial lifting pipe (10), which is mounted on Teflon and is consequently easily radially movable. By virtue of the funnel-shaped configuration of the pipe outlet flange (9), the two flanges are centered in relation to each other. Restoring springs (3) guide the initial lifting pipe (10) back into the central rest position after the undocking.

The high-performance through-flow weigher (11) is connected to the granulate conveying pipe in a manner free from dead space and can be flushed with water to remove remains of granulate. Such high-performance through-flow weighers are commercially available and are marketed for example under the specification electronic net weigher by the company Haver & Boecker.

The pipe inlet flange on the initial lifting pipe (10) is preferably configured such that they allow a, at normal pressure, dust-tight and water-tight connection to the respective counter flanges of corresponding containers, pipeline ends or other docking devices, the flange connections preferably being free from joints or dead spaces of any kind. The contamination of granulate batches with foreign granules from the filling of preceding granulates can thereby be largely avoided. Additional sealing materials can be used for the flanges, but are not absolutely necessary. Suitable materials for such flanges, as well as for the telescopic pipe, are plastic, metal or steel; special steel is preferable. The pipe length is preferably matched to the height of the stages within the building or to the distances apart of the apparatuses to be connected. As a centring aid, and thus for easier assembly, the flanges and counter flanges are preferably conical in design.

Where necessary, the flanges or counter flanges of the telescopic conveying pipe according to the invention can in a preferred embodiment optionally additionally contain sensors (2) which indicate the position of the flange of a docking device by way of a so-called initiator query and thus automatically reliably signal a correct docking operation. Such initiators are commercially available instruments and are marketed by the company Pepperl and Fuchs, for instance, under specification NCB15-30GM40-N0-V1.

Generally the telescopic conveying pipe according to the invention, due to its dimensions and its intrinsic weight, cannot readily be manually handled, particularly not during the docking manoeuvres, which call for high precision. In order to facilitate this handling, the telescopic conveying pipe, in a preferred embodiment, is brought into the desired working position with the aid of a mobile work platform, as represented schematically, by way of example, in FIG. 1.

The telescopic conveying pipe can be pushed through a floor opening without difficulty with the aid of the above-described mobile work platform (FIG. 1), so that apparatuses separated by more than one stage can reliably be connected to one another.

The work platform according to the invention is suitable for moving the telescopic conveying pipe from one location to another. Since this work platform can be transported, the telescopic conveying pipe can thereby be mounted very flexibly at different filling position. In a preferred embodiment, the lifting and lowering devices (in particular the mobile telescopic portion) can be mechanically, pneumatically supported, for instance, by electric drives (15). The lifting and lowering of the pipe is performed by a cable winch (15) with slack cable monitoring. If the pipe is resting on the container to be filled, a roller lying on the cable, which is then moved downwards by the slackened cable, actuates by way of a lever arm a switch which brings about the switching off of the cable. At the same time, this switching off is used as the go-ahead for a filling process, in order that granulate cannot escape from the above solids-removal device in an uncontrolled manner.

Similarly the entire work platform can preferably be moved by electric, where necessary movable drives. Movable drives, i.e. drives which are independently transmovable and can be decoupled from the conveyed material, have the advantage that they can be used for different transport functions. This so-called small tractor or mover (14) can be positively connected to the frame of the work platform by means of a lifting gear including an adaptation boom. The operator can thus accelerate, brake and steer the work platform using a driven rotatable ground wheel of the mover, as represented in FIG. 1. Drives which are fixedly connected to the work platform can also however be used.

In order to aid the positioning of the work platform beneath a silo, in a preferred embodiment three positioning lasers (6), which cast two or more, preferably three, light spots onto the floor, are used. When correctly positioned, the light spots are located in an accurately defined region, for instance on the round floor cover rim.

For further work safety, in another preferred embodiment, a separate lifting-transporting device (7), for instance with electrical lifting magnet (8), is used to open the floor cover (if present) for the protection of the floor opening.

Thus a cover lifting device (7 and 8) is preferably fixedly connected to the mobile work platform for the telescopic conveying pipe, by means of which covers present in floor openings can be raised from stages within the building and set aside, where necessary, in order that the telescopic conveying pipe can be run through the freed floor opening. The cover lifting device (7 and 8) is here integrated in the mobile work platform such that the lifting mechanism operates directly below the pipe outlet flange. The design and working method of such a cover lifting device is illustrated by FIG. 2.

This cover lifting device (7 and 8) can in principle also be used as a separate, where necessary mobile device.

Thus, a conveying device is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A conveying device comprising a telescopic conveying pipe having a plurality of pipe segments and including
   a) an initial lifting pipe (10) with a conical inlet flange on an upper conveying pipe segment with radial tolerance compensation and restoring springs;
   b) a continuous transit weigher (11) in flow communication with the conveying pipe segment and having a funnel and a fixed section of pipe segment;
   c) a large lifting pipe segment (13) in flow communication with the fixed section of pipe segment and having a cable winch (15) and slack cable monitor;
   d) a resting ring (16) and filling level monitor on the lifting pipe segment at the telescopic conveying pipe outlet;
   e) an annular flushing device (12) on one of the pipe segments;
   f) one of flushing device components partly fixedly mounted, flushing pipes or a flushing ball with a flange mounted on one of the pipe segments;
   g) tubing in flow communication with one of the pipe segments for compressed air and pipelines for fully demineralized water and waste water;
   h) closing, controlling valves; and
   i) a local control unit for filling and flushing processes and operating the valves.

2. The conveying device according to claim 1, wherein the telescopic conveying pipe has a flange, and a sensor is provided on the flange of the telescopic conveying pipe.

3. The conveying device according to claim 1, wherein the device is constructed to minimize dead space.

4. The conveying device according to claim 1, wherein the telescopic conveying pipe is disposed on a mobile work platform adapted for transport of the telescopic conveying pipe to different filling sites on the stage, the mobile work platform including a lifting/transporting device (10, 15) for positioning of the telescopic conveying pipe at different docking devices on a stage.

5. The conveying device according to claim 4, wherein the lifting/transporting device (8) is supported by an electric drive.

6. The conveying device according to claim 4, wherein the lifting/transporting device is adapted for secure removal of a floor cover on the work platform.

7. The conveying device according to claim 4, wherein the work platform is movable by electric drives or movable drives.

8. Conveying device according to claim 4, characterized in that a common position of the light spots of positioning lasers supports a positioning operation of the work platform.

9. The conveying device according to claim 4, further comprising at least two positioning lasers adapted to create light spots on a floor, such that a common position of the light spots serves as indicia of appropriate operational positioning of the work platform.

10. The conveying device according to claim 1, wherein a slack cable enquiry serves as an indicia to begin a filling process.

11. The conveying device according to claim 1, wherein the initial lifting pipe (10) is radially displaceable.

12. A method for cleaning the conveying device according to claim 1, wherein a flushing program automates a flushing process and selects flushing components for the introduction of water from the top downwards.

13. The method for cleaning the conveying device according to claim 12, wherein the annular flushing device cleans the outer side of the telescopic pipe.

* * * * *